(12) United States Patent
Park

(10) Patent No.: US 11,507,232 B2
(45) Date of Patent: Nov. 22, 2022

(54) SENSOR MODULE AND DISPLAY DEVICE INCLUDING THE SAME

(71) Applicant: SAMSUNG DISPLAY CO., LTD., Yongin-si (KR)

(72) Inventor: Sung Hyun Park, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 16/909,371

(22) Filed: Jun. 23, 2020

(65) Prior Publication Data
US 2021/0004124 A1 Jan. 7, 2021

(30) Foreign Application Priority Data
Jul. 5, 2019 (KR) .................. 10-2019-0081376

(51) Int. Cl.
*G06F 3/044* (2006.01)
*G06F 3/041* (2006.01)

(52) U.S. Cl.
CPC .......... *G06F 3/0445* (2019.05); *G06F 3/0446* (2019.05); *G06F 3/0448* (2019.05); *G06F 3/041662* (2019.05); *G06F 2203/04111* (2013.01)

(58) Field of Classification Search
CPC ............. G06F 3/0445; G06F 3/0446; G06F 3/041662; G06F 3/0448; G06F 2203/04111; G06F 3/0443; G06F 2203/04112; G06F 3/0416; G06F 3/044; G06K 9/0002
See application file for complete search history.

(56) References Cited

U.S. PATENT DOCUMENTS

| 2014/0253499 | A1* | 9/2014 | Lee | ............... | G06F 3/0448 |
| | | | | | 345/174 |
| 2017/0123555 | A1* | 5/2017 | Kim | ............... | G06F 3/0412 |
| 2017/0262109 | A1* | 9/2017 | Choi | ............... | H01L 51/5253 |
| 2018/0039349 | A1* | 2/2018 | Han | ............... | G06V 40/1365 |

(Continued)

FOREIGN PATENT DOCUMENTS

| KR | 10-2018-0026597 | | 3/2018 |
| KR | 10-2018-0067226 | | 6/2018 |
| WO | WO 2019/128288 | * | 7/2019 |

*Primary Examiner* — Md Saiful A Siddiqui
(74) *Attorney, Agent, or Firm* — F. Chau & Associates, LLC

(57) ABSTRACT

A sensor module includes a base layer including a fingerprint sensing area, first touch electrode members arranged on the base layer along a first direction, and including a plurality of first touch electrodes connected to one another along the first direction, where each first touch electrode includes a first opening, second touch electrode members arranged on the base layer along a second direction crossing the first direction, and including a plurality of second touch electrodes connected to one another along the second direction, a first fingerprint electrode member disposed on the fingerprint sensing area, and including a plurality of first fingerprint electrodes connected to one another, and a second fingerprint electrode member disposed on the fingerprint sensing area, and including a plurality of second fingerprint electrodes connected to one another. The plurality of first fingerprint electrodes and the plurality of second fingerprint electrodes are disposed in the first opening.

16 Claims, 17 Drawing Sheets

(56) References Cited

U.S. PATENT DOCUMENTS

| | | | | |
|---|---|---|---|---|
| 2018/0068156 A1* | 3/2018 | Jang | ................... | G06K 9/0002 |
| 2018/0329576 A1* | 11/2018 | Kim | ................... | G06F 3/0418 |
| 2019/0114455 A1* | 4/2019 | Kim | ................... | G06F 21/32 |
| 2019/0294846 A1* | 9/2019 | Li | ................... | G06F 3/0448 |
| 2020/0319745 A1* | 10/2020 | Teramoto | ............ | H05K 3/0017 |

* cited by examiner

SENSOR MODULE AND DISPLAY DEVICE INCLUDING THE SAME

CROSS-REFERENCE TO RELATED APPLICATION

This application claims priority under 35 U.S.C. § 119 to Korean Patent Application No. 10-2019-0081376, filed on Jul. 5, 2019 in the Korean Intellectual Property Office, the disclosure of which is incorporated by reference herein in its entirety.

TECHNICAL FIELD

Exemplary embodiments of the inventive concept relate to a sensor module and a display device including the same.

DISCUSSION OF RELATED ART

An electronic device, such as a smartphone, a tablet personal computer (PC), a digital camera, a laptop computer, a navigation system, or a smart television, which provides an image to a user, includes a display device for displaying the image. The display device includes a display panel for generating and displaying the image, as well as various input devices.

Recently, a touch sensor which recognizes a touch input has been widely applied to display devices, mainly in smartphones or tablet PCs. Touch sensors, with the convenience of a touch-screen interface, have been replacing conventional keypads, which are physical input devices.

SUMMARY

According to an exemplary embodiment of the inventive concept, a sensor module includes a base layer including a fingerprint sensing area; first touch electrode members arranged on the base layer along a first direction, and including a plurality of first touch electrodes electrically connected to one another along the first direction, where each of the plurality of first touch electrodes includes a first opening, second touch electrode members arranged on the base layer along a second direction crossing the first direction, and including a plurality of second touch electrodes electrically connected to one another along the second direction, a first fingerprint electrode member disposed on the fingerprint sensing area, and including a plurality of first fingerprint electrodes electrically connected to one another, and a second fingerprint electrode member disposed on the fingerprint sensing area, and including a plurality of second fingerprint electrodes electrically connected to one another. The plurality of first fingerprint electrodes and the plurality of second fingerprint electrodes are disposed in the first opening of the plurality of first touch electrodes.

Each of the plurality of second touch electrodes includes a second opening, and at least two first fingerprint electrodes of the plurality of first fingerprint electrodes and at least two second fingerprint electrodes of the plurality of second fingerprint electrodes are disposed in the second opening.

The first fingerprint electrode member further includes a first connection pattern electrically connecting adjacent first fingerprint electrodes of the plurality of first fingerprint electrodes in the same first opening.

The first fingerprint electrode member further includes a first connection line electrically connecting adjacent first fingerprint electrodes, among the plurality of first fingerprint electrodes, that are disposed in the first opening and the second opening.

The second fingerprint electrode member further includes a second connection line electrically connecting adjacent second fingerprint electrodes of the plurality of second fingerprint electrodes.

The first connection pattern and the second connection line are located on different layers, and the first connection pattern and the second connection line cross each other.

The plurality of first touch electrodes, the plurality of second touch electrodes, the plurality of first fingerprint electrodes, and the plurality of second fingerprint electrodes are disposed on the same layer.

The first connection pattern is located on a layer different from a layer where the plurality of first touch electrodes and the plurality of second touch electrodes are located, and the first connection pattern partially overlaps the plurality of first touch electrodes and the plurality of second touch electrodes.

The second connection line is located on a layer different from a layer where the plurality of first touch electrodes and the plurality of second touch electrodes are located, and the second connection line partially overlaps the plurality of first touch electrodes and the plurality of second touch electrodes.

The plurality of first fingerprint electrodes and the plurality of second fingerprint electrodes are spaced apart from each other.

The plurality of first fingerprint electrodes and the plurality of second fingerprint electrodes are spaced apart from the plurality of first touch electrodes and the plurality of second touch electrodes.

The first connection pattern and the first connection line extend in a first diagonal direction, and the second connection line extends in a second diagonal direction crossing the first diagonal direction, and the first and second diagonal directions are diagonal with respect to the first direction.

The base layer includes a first encapsulation inorganic layer, an encapsulation organic layer disposed on the first encapsulation inorganic layer, and a second encapsulation inorganic layer disposed on the encapsulation organic layer, and the first connection line and the second connection line are disposed on the second encapsulation inorganic layer.

The first connection pattern is disposed on the same layer as the plurality of first fingerprint electrodes.

The sensor module further includes a touch driver electrically connected to the second touch electrode members and configured to apply a first driving signal to the second touch electrode members, and a touch detector electrically connected to the first touch electrode members and configured to receive a first sensing signal from the first touch electrode members to recognize a touch input.

The sensor module further includes a fingerprint driver electrically connected to the second fingerprint electrode member and configured to apply a second driving signal to the second fingerprint electrode member, and a fingerprint detector electrically connected to the first fingerprint electrode member and configured to receive a second sensing signal from the first fingerprint electrode member to recognize a fingerprint pattern.

The first sensing signal includes mutual capacitance information between the first touch electrode members and the second touch electrode members, and the second sensing signal includes mutual capacitance information between the first fingerprint electrode member and the second fingerprint electrode member.

According to an exemplary embodiment of the inventive concept, a display device includes a base substrate, a light emitting element on the base substrate, a thin film encapsulation layer on the light emitting element, a touch electrode disposed on the thin film encapsulation layer and including an opening, a fingerprint electrode disposed in the opening and spaced apart from the touch electrode, and a sensor controller electrically connected to each of the touch electrode and the fingerprint electrode and configured to detect a touch input from the touch electrode and to detect fingerprint pattern information from the fingerprint electrode.

The fingerprint electrode includes a plurality of first fingerprint electrodes and a plurality of second fingerprint electrodes, and the plurality of first fingerprint electrodes and the plurality of second fingerprint electrodes are disposed in the opening of the touch electrode.

The plurality of first fingerprint electrodes and the plurality of second fingerprint electrodes are spaced apart from one another, and the plurality of first fingerprint electrodes and the plurality of second fingerprint electrodes are disposed on the same layer as the touch electrode.

According to an exemplary embodiment of the inventive concept, a sensor module includes a plurality of first touch electrodes arranged along a first direction and each including a first opening, a plurality of second touch electrodes arranged along a second direction crossing the first direction and each including a second opening, and a plurality of fingerprint electrodes disposed in the first opening and the second opening. The plurality of first touch electrodes, the plurality of second touch electrodes, and the plurality of fingerprint electrodes are disposed on the same layer.

BRIEF DESCRIPTION OF THE DRAWINGS

The above and other aspects and features of the inventive concept will become more apparent by describing in detail exemplary embodiments thereof with reference to the attached drawings.

DETAILED DESCRIPTION OF THE EMBODIMENTS

Figure 1:
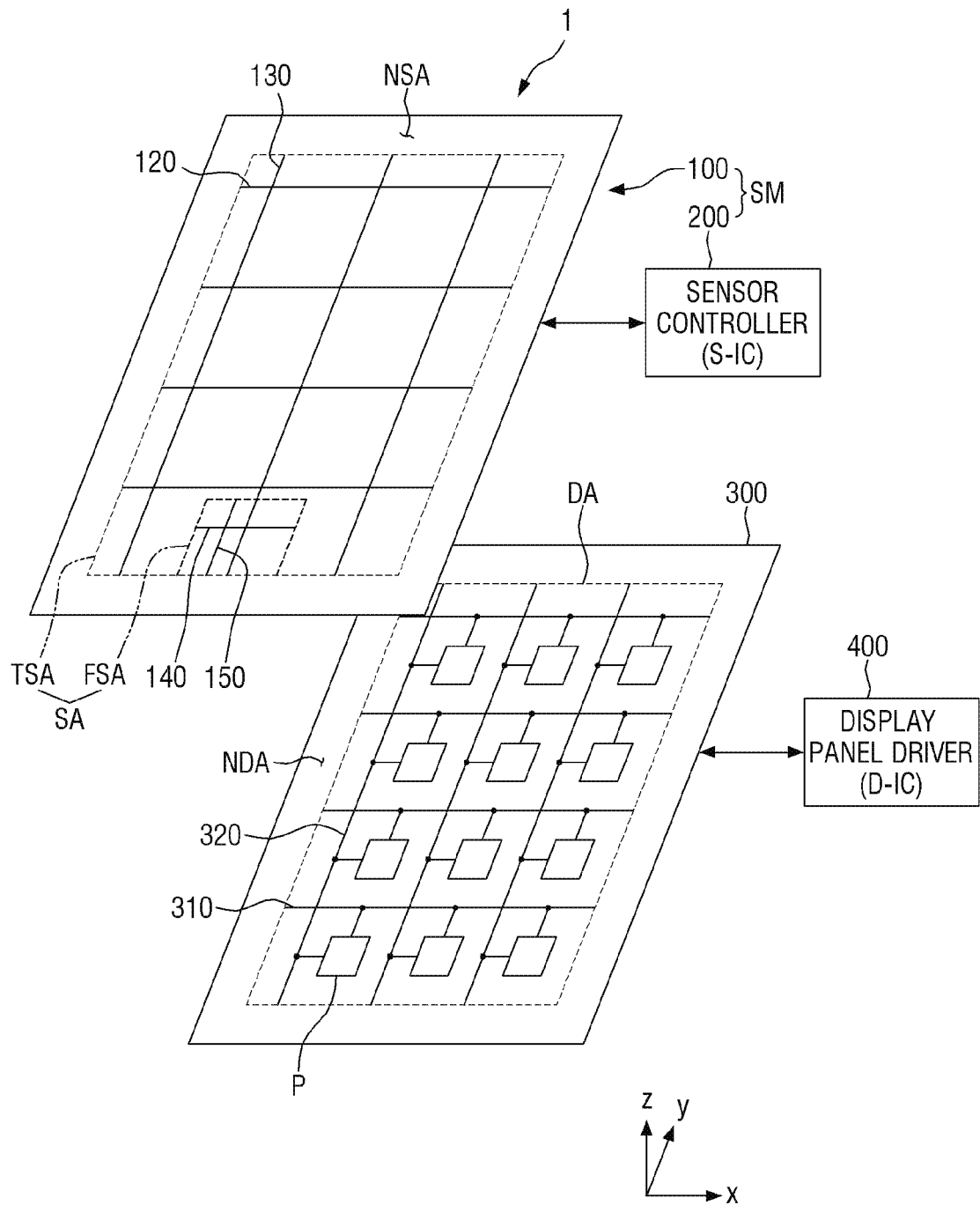
FIG. 1 is a diagram schematically illustrating a display device according to an exemplary embodiment of the inventive concept.

Exemplary embodiments of the inventive concept provide a sensor module capable of sensing a touch input of a user and a position thereof as well as a fingerprint pattern of the user, and a display device including the same.

Exemplary embodiments of the inventive concept will be described more fully hereinafter with reference to the accompanying drawings. Like reference numerals may refer to like elements throughout this application.

In the attached drawings, the thickness and sizes of layers and regions may be exaggerated for clarity. It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the inventive concept.

Exemplary embodiments are described herein with reference to plan and cross-section illustrations that are schematic illustrations of idealized embodiments of the inventive concept. As such, variations from the shapes of the illustrations as a result, for example, of manufacturing techniques and/or tolerances, are to be expected. Thus, the inventive concept should not be construed as limited to the particular shapes of regions illustrated herein but are to include deviations in shapes that result, for example, from manufacturing. Thus, the regions illustrated in the drawings are schematic in nature and their shapes are not intended to illustrate the actual shape of a region of a device and are not intended to limit the scope of the inventive concept.

Figure 2:
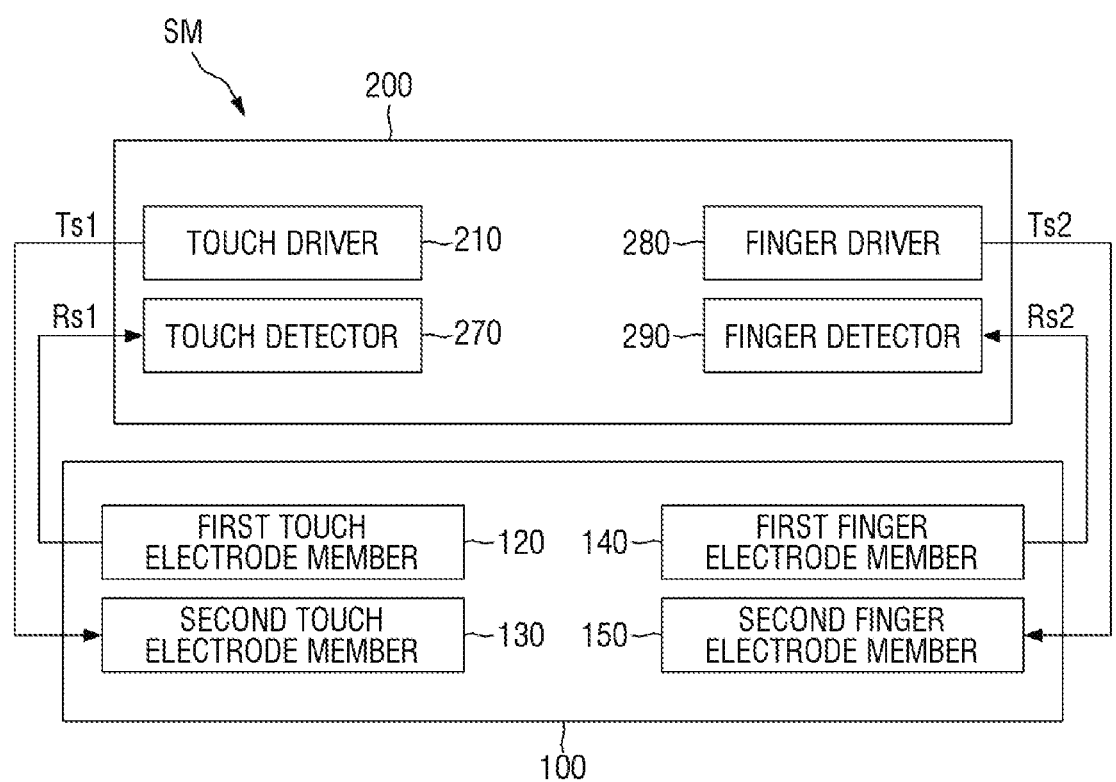
FIG. 2 is a block diagram of a sensor module of FIG. 1 according to an exemplary embodiment of the inventive concept.

FIG. 1 is a diagram schematically illustrating a display device according to an exemplary embodiment of the inventive concept. FIG. 2 is a block diagram of a sensor module of FIG. 1 according to an exemplary embodiment of the inventive concept.

Referring to FIGS. 1 and 2, a display device 1 according to an exemplary embodiment of the inventive concept may include a sensor module SM and a display panel 300. The display device 1 may further include a display panel driver 400. The sensor module SM includes a sensor unit 100 and a sensor controller 200.

Although FIG. 1 illustrates that the sensor unit 100 and the display panel 300 are separated from each other, this is merely for convenience of description and the inventive concept is not limited thereto. For example, the sensor unit 100 and the display panel 300 may be integrally formed.

The display panel 300 includes a display area DA and a non-display area NDA surrounding at least one region of the display area DA. The display area DA is provided with a plurality of scan lines 310 and data lines 320, and a plurality of pixels P connected to the scan lines 310 and data lines 320. The non-display area NDA may be provided with various driving signals for driving the pixels P and/or wirings for supplying driving power.

According to exemplary embodiments of the inventive concept, the type of the display panel 300 is not particularly limited. For example, the display panel 300 may be a self-luminous display panel such as an organic light emitting display (OLED) panel, a quantum dot light emitting display (QLED) panel, a micro-light emitting diode (LED) display panel, a nano-LED display panel, or the like. Alternatively, the display panel 300 may be a non-luminous display panel such as a liquid crystal display (LCD) panel, an electrophoretic display (EPD) panel, or an electro-wetting display (EWD) panel. When the display panel 300 is a non-luminous display panel, the display device may further include a back-light unit for supplying light to the display panel 300. Hereinafter, a case where the display panel 300 is an organic light emitting display panel will be described as an example, for convenience of explanation.

The display panel driver 400 is electrically connected to the display panel 300 to supply signals for driving the display panel 300. For example, the display panel driver 400 may include at least one of a scan driver for supplying scan signals to the scan lines 310, a data driver for supplying data signals to the data lines 320, or a timing controller for driving the scan driver and the data driver. According to an exemplary embodiment of the inventive concept, the scan driver, the data driver, and/or the timing controller may be integrated into one display integrated circuit (IC) (D-IC), but the inventive concept is not limited thereto. For example, in an exemplary embodiment of the inventive concept, at least one of the scan driver, the data driver, and the timing controller may be integrated or mounted on the display panel 300.

The sensor unit 100 may be provided on at least one region of the display panel 300. For example, the sensor unit 100 may be provided to overlap the display panel 300 on at least one surface of the display panel 300. For example, the sensor unit 100 may be disposed on one surface (e.g., an upper surface), in a direction in which an image is emitted, of the display panel 300. Alternatively, the sensor unit 100 may be formed directly on at least one of both surfaces of the display panel 300, or the sensor unit 100 may be formed inside the display panel 300. For example, the sensor unit 100 may be formed directly on an outer surface (e.g., an upper surface of an upper substrate or a lower surface of a lower substrate) of the upper substrate (or a thin film encapsulation layer) or the lower substrate of the display panel 300. Alternatively, the sensor unit 100 may be formed directly on an inner surface (e.g., a lower surface of the upper substrate or an upper surface of the lower substrate) of the upper substrate or the lower substrate.

The sensor unit 100 includes a sensing area SA and a peripheral area NSA surrounding at least a portion of the sensing area SA. In exemplary embodiments of the inventive concept, the sensing area SA may be an area, capable of sensing a touch input and a fingerprint, in the sensor unit 100, and the peripheral area NSA may be an area, incapable of sensing a touch input and a fingerprint, in the sensor unit 100. According to an exemplary embodiment of the inventive concept, the sensing area SA may be disposed to correspond to the display area DA of the display panel 300, and the peripheral area NSA may be disposed to correspond to the non-display area NDA of the display panel 300. For example, the sensing area SA of the sensor unit 100 may overlap the display area DA of the display panel 300, and the peripheral area NSA of the sensor unit 100 may overlap the non-display area NDA of the display panel 300.

The sensing area SA may include a touch sensing area TSA and a fingerprint sensing area FSA. The touch sensing area TSA is an area for sensing a user's touch input, and the fingerprint sensing area FSA is an area for sensing a user's fingerprint pattern. In exemplary embodiments of the inventive concept, the touch sensing area TSA may coincide with the sensing area SA, and the fingerprint sensing area FSA may be a portion of the touch sensing area TSA. However, the inventive concept is not limited thereto, and the fingerprint sensing area FSA may coincide with the touch sensing area TSA.

In the touch sensing area TSA of the sensor unit 100, a plurality of first touch electrode members 120 and a plurality of second touch electrode members 130 may be provided to detect a touch input.

The first touch electrode members 120 may extend in a first direction x and may be spaced apart from one another in a second direction y crossing the first direction x. In other words, the first touch electrode members 120 extending in the first direction x may be spaced apart from one another along the second direction y to form electrode rows.

The second touch electrode members 130 may extend in the second direction y and may be spaced apart from one another in the first direction x. The second touch electrode members 130 may be spaced apart from the first touch electrode members 120 and insulated from the first touch electrode members 120. In other words, the second touch electrode members 130 extending in the second direction y may be spaced apart from one another along the first direction x to form columns.

In the fingerprint sensing area FSA of the sensor unit 100, a plurality of first fingerprint electrode members 140 and a plurality of second fingerprint electrode members 150 may be provided to detect a fingerprint pattern.

The first fingerprint electrode members 140 may extend in the first direction x and may be spaced apart from one another in the second direction y. In other words, the first fingerprint electrode members 140 extending in the first direction x may be spaced apart from one another along the second direction y to form electrode rows.

The second fingerprint electrode members 150 may extend in the second direction y and may be spaced apart from one another in the first direction x. The second fingerprint electrode members 150 may be spaced apart from the first fingerprint electrode members 140 and insulated from the first fingerprint electrode members 140. In other words, the second fingerprint electrode members 150 extending in the second direction y may be spaced apart from one another along the first direction x to form columns.

Figure 3:
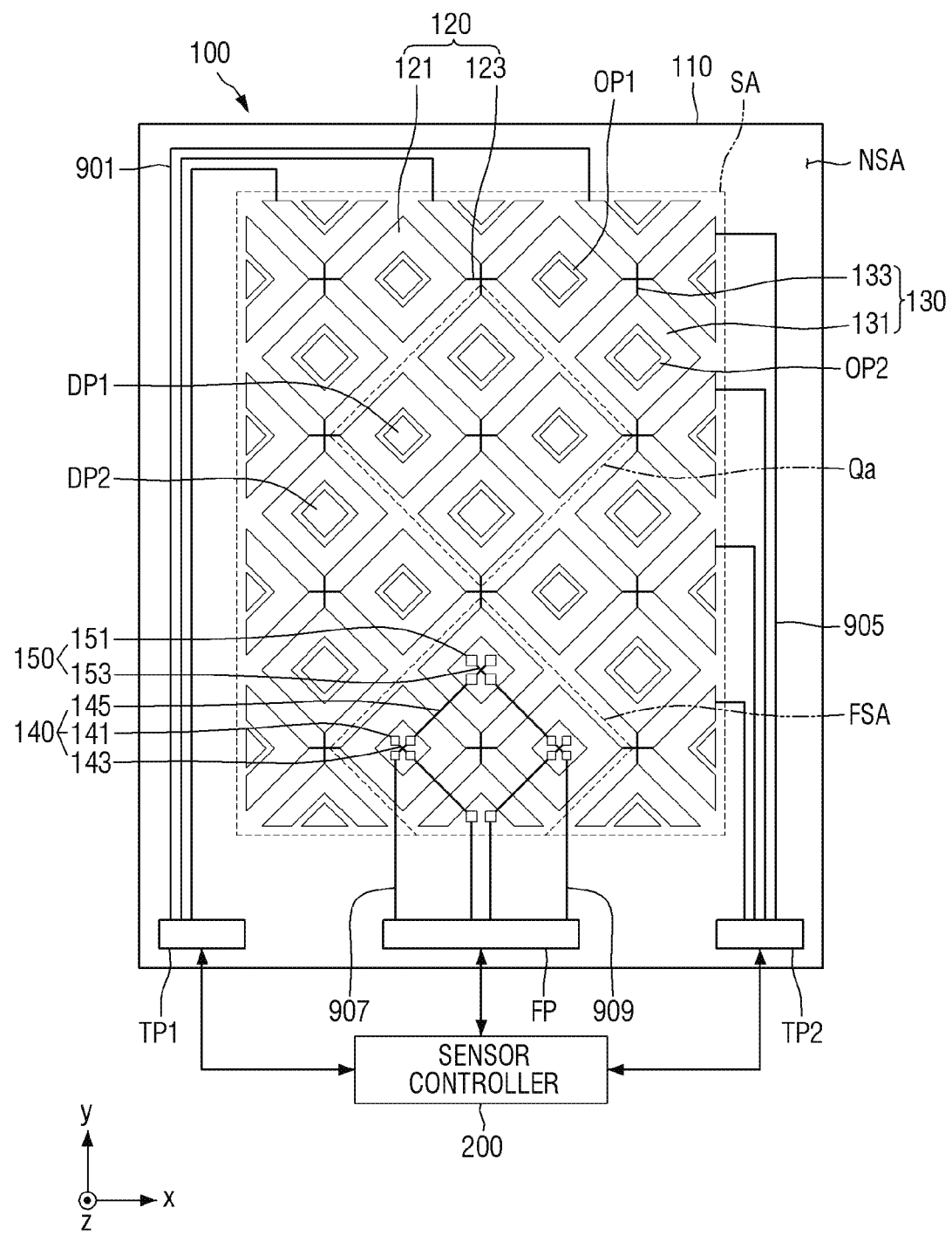
FIG. 3 is a diagram illustrating a plan view of a sensor unit of the sensor module of FIG. 2, and a connection relationship between the sensor unit and a controller according to an exemplary embodiment of the inventive concept.

The shape, size, and/or arrangement direction of the first touch electrode members 120, the second touch electrode members 130, the first fingerprint electrode members 140, and the second fingerprint electrode members 150 is not particularly limited. For example, the first touch electrode members 120, the second touch electrode members 130, the first fingerprint electrode members 140, and the second fingerprint electrode members 150 may be configured as shown in FIG. 3, which will be described below.

The first touch electrode members 120, the second touch electrode members 130, the first fingerprint electrode members 140, and the second fingerprint electrode members 150 may be electrically connected to the sensor controller 200. In exemplary embodiments of the inventive concept, the second touch electrode members 130 and the second fingerprint electrode members 150 may be driving electrode members which receive driving signals Ts for touch detection and fingerprint detection from the sensor controller 200. The first touch electrode members 120 and the first fingerprint electrode members 140 may be sensing electrode members which output sensing signals Rs for touch detection and fingerprint detection to the sensor controller 200.

The first touch electrode members 120, the second touch electrode members 130, the first fingerprint electrode members 140, and the second fingerprint electrode members 150 may overlap at least one electrode of the display panel 300. For example, when the display panel 300 is an organic light emitting display panel, the first touch electrode members 120, the second touch electrode members 130, the first fingerprint electrode members 140 and the second fingerprint electrode members 150 may overlap a cathode electrode and the like of the display panel 300.

In exemplary embodiments of the inventive concept, the first fingerprint electrode members 140 and the second fingerprint electrode members 150 may partially overlap the first touch electrode members 120 and the second touch electrode members 130.

The sensor controller 200 may be electrically connected to the sensor unit 100 and supply a first driving signal Ts1 to the sensor unit 100 and receive a first sensing signal Rs1 corresponding to the first driving signal Ts1 from the sensor unit 100 to detect a touch position. Further, the sensor controller 200 may supply a second driving signal Ts2 to the sensor unit 100 and receive a second sensing signal Rs2 corresponding to the second driving signal Ts2 from the sensor unit 100 to detect a fingerprint pattern.

In exemplary embodiments of the inventive concept, the sensor controller 200 may include a touch driver 210, a touch detector 270, a fingerprint driver 280, and a fingerprint detector 290. However, the inventive concept is not limited thereto, and the sensor controller 200 may be divided into a touch controller including the touch driver 210 and the touch detector 270, and a fingerprint controller including the fingerprint driver 280 and the fingerprint detector 290, which are disposed as separate components.

The touch driver 210 may provide the first driving signal Ts1 for detecting a touch input to the second touch electrode members 130.

The touch detector 270 may receive the first sensing signal Rs1 corresponding to the first driving signal Ts1 from the first touch electrode members 120 during a touch sensing operation to detect the presence or absence and/or position of a touch input. In exemplary embodiments of the inventive concept, the first sensing signal Rs1 may be an amount of change in mutual capacitance generated between the first touch electrode members 120 and the second touch electrode members 130. For example, when a touch input occurs, the mutual capacitance is changed at a point where the touch input is provided or a peripheral portion thereof. The touch detector 270 may receive the change amount of mutual capacitance between the first touch electrode members 120 and the second touch electrode members 130 as the first sensing signal Rs1 to determine the presence or absence of the touch input and/or a position of the touch input based thereon.

In exemplary embodiments of the inventive concept, the touch detector 270 may include at least one amplifier for amplifying the received sensing signal Rs1, an analog digital converter connected to an output terminal of the amplifier, and a processor.

The fingerprint driver 280 may provide the second driving signal Ts2 for detecting a fingerprint pattern to the second fingerprint electrode members 150.

The fingerprint detector 290 may receive the second sensing signal Rs2 corresponding to the second driving signal Ts2 from the first fingerprint electrode members 140 to detect the user's fingerprint pattern during a sensing period of the fingerprint pattern. In exemplary embodiments of the inventive concept, the second sensing signal Rs2 may be an amount of change in mutual capacitance generated between the first fingerprint electrode members 140 and the second fingerprint electrode members 150. For example, when the user's finger is in contact, the mutual capacitance between the first fingerprint electrode members 140 and the second fingerprint electrode members 150 is changed in a region where the finger is in contact. The change in mutual capacitance may be different between the first fingerprint electrode members 140 and the second fingerprint electrode members 150 adjacent to a valley and between the first fingerprint electrode members 140 and the second fingerprint electrode members 150 adjacent to a ridge where a fingerprint appears. The fingerprint detector 290 may receive the difference in mutual capacitance between the first fingerprint electrode members 140 and the second fingerprint electrode members 150 as the second sensing signal Rs2 and determine the user's fingerprint pattern information based thereon.

In exemplary embodiments of the inventive concept, the touch driver 210, the touch detector 270, the fingerprint driver 280, and the fingerprint detector 290 may be integrated into one sensor IC. However, the inventive concept is not limited thereto. In exemplary embodiments of the inventive concept, the touch driver 210 and the touch detector 270, and the fingerprint driver 280 and the fingerprint detector 290 may be configured as separate ICs.

Hereinafter, the sensor module SM will be described in more detail with reference to FIGS. 3 to 17.

Figure 4:
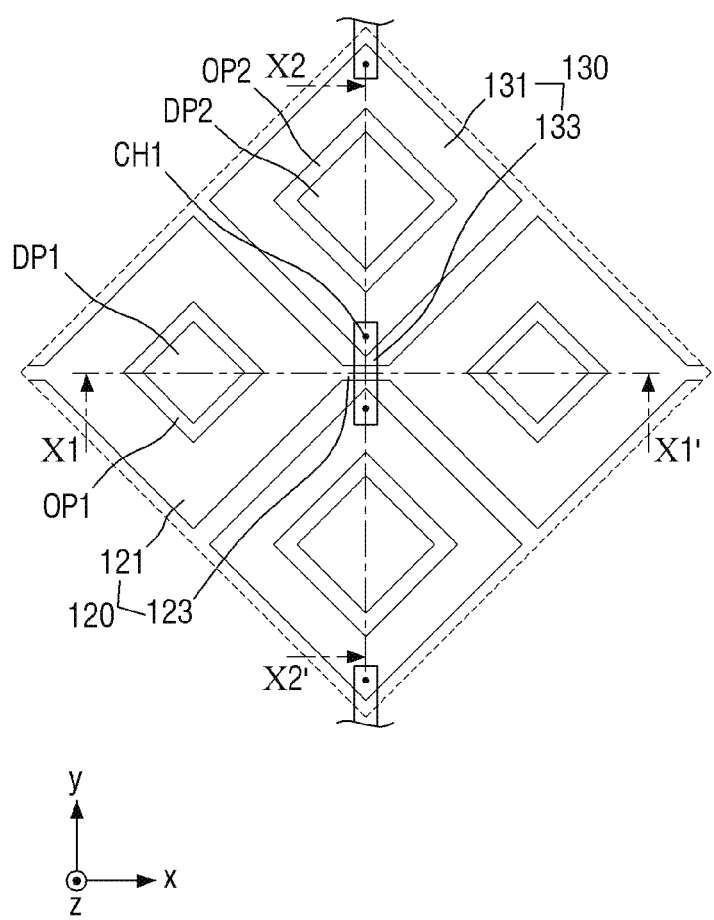
FIG. 4 is an enlarged plan view of a portion Qa of FIG. 3 according to an exemplary embodiment of the inventive concept.
Figure 5:
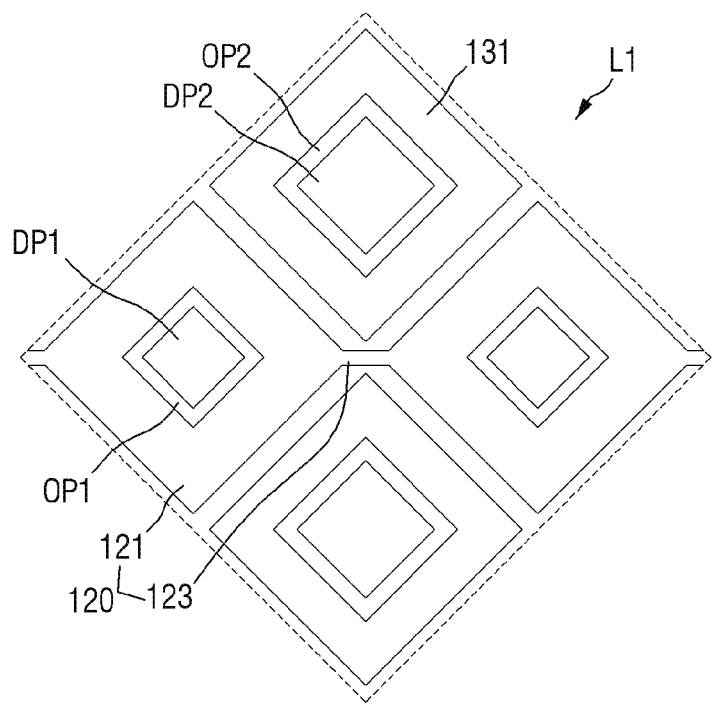
FIG. 5 is a diagram illustrating a structure of a first layer of the sensor unit shown in FIG. 4 according to an exemplary embodiment of the inventive concept.
Figure 6:
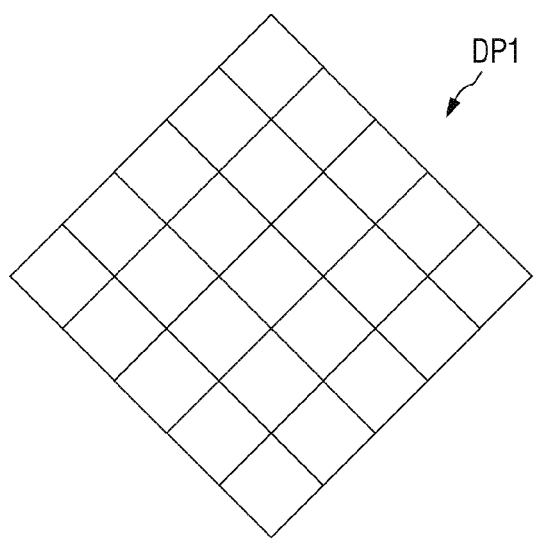
FIG. 6 is an enlarged plan view of a first dummy pattern of FIG. 5 according to an exemplary embodiment of the inventive concept.
Figure 6:
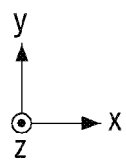
Figure 7:
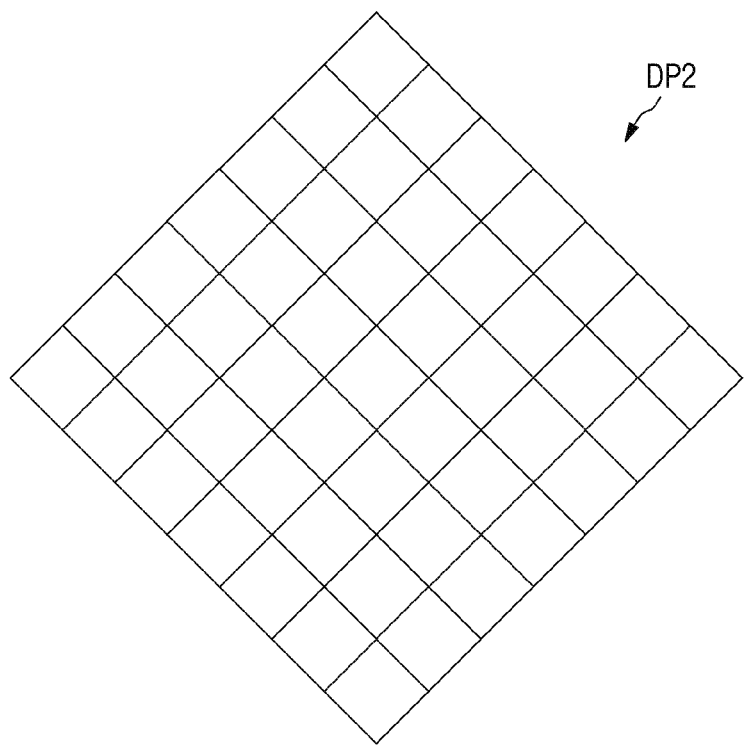
FIG. 7 is an enlarged plan view of a second dummy pattern of FIG. 5 according to an exemplary embodiment of the inventive concept.

FIG. 3 is a diagram illustrating a plan view of a sensor unit of the sensor module of FIG. 2, and a connection relationship between the sensor unit and the controller according to an exemplary embodiment of the inventive concept. FIG. 4 is an enlarged plan view of a portion Qa of FIG. 3 according to an exemplary embodiment of the inventive concept. FIG. 5 is a diagram illustrating a structure of a first layer of the sensor unit shown in FIG. 4 according to an exemplary embodiment of the inventive concept. FIG. 6 is an enlarged plan view of a first dummy pattern of FIG. 5 according to an exemplary embodiment of the inventive concept. FIG. 7 is an enlarged plan view of a second dummy pattern of FIG. 5 according to an exemplary embodiment of the inventive concept.

Figure 8:
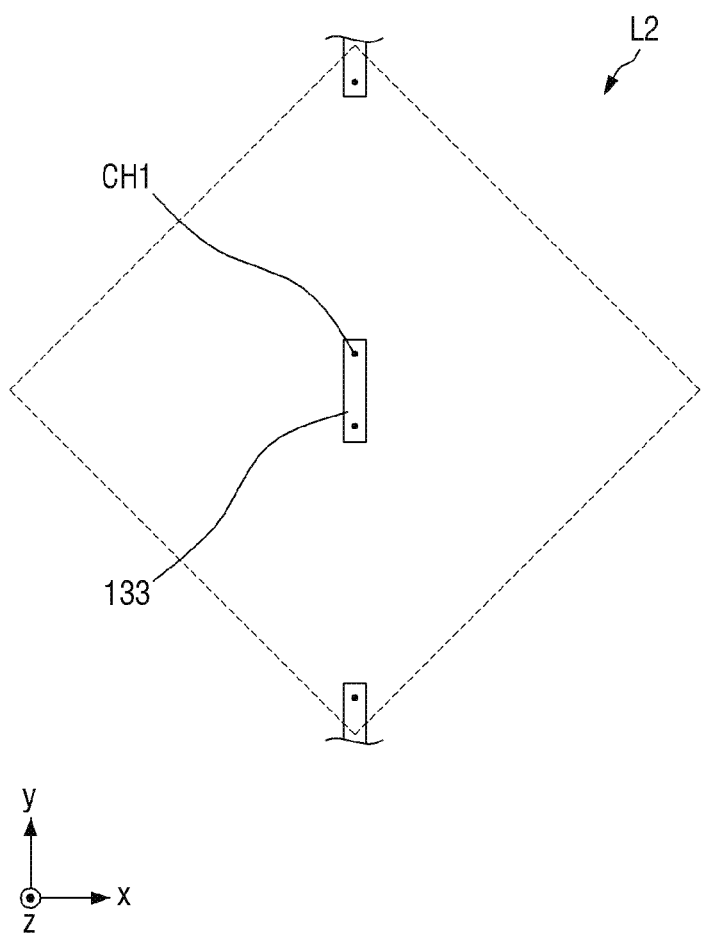
FIG. 8 is a diagram illustrating a structure of a second layer and a position of a contact hole of the sensor unit shown in FIG. 4 according to an exemplary embodiment of the inventive concept.
Figure 9:
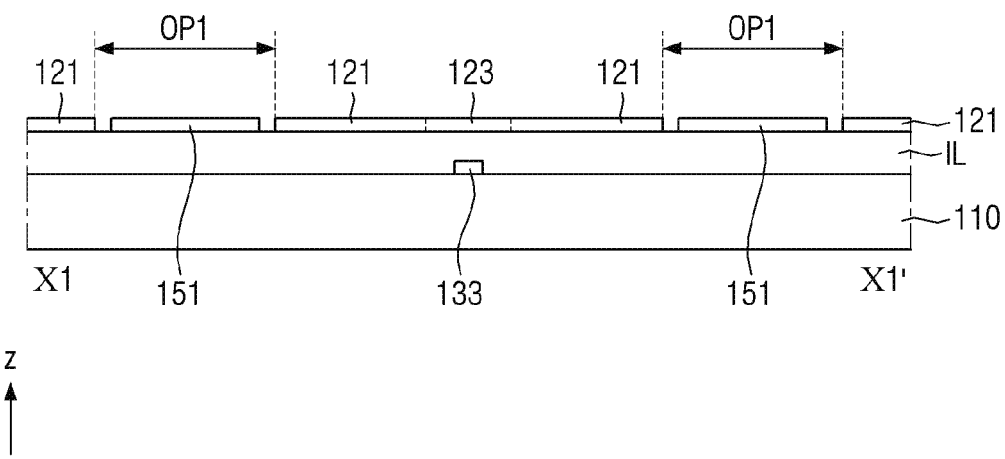
FIG. 9 is a cross-sectional view taken along line X1-X1' of FIG. 4 according to an exemplary embodiment of the inventive concept.
Figure 10:
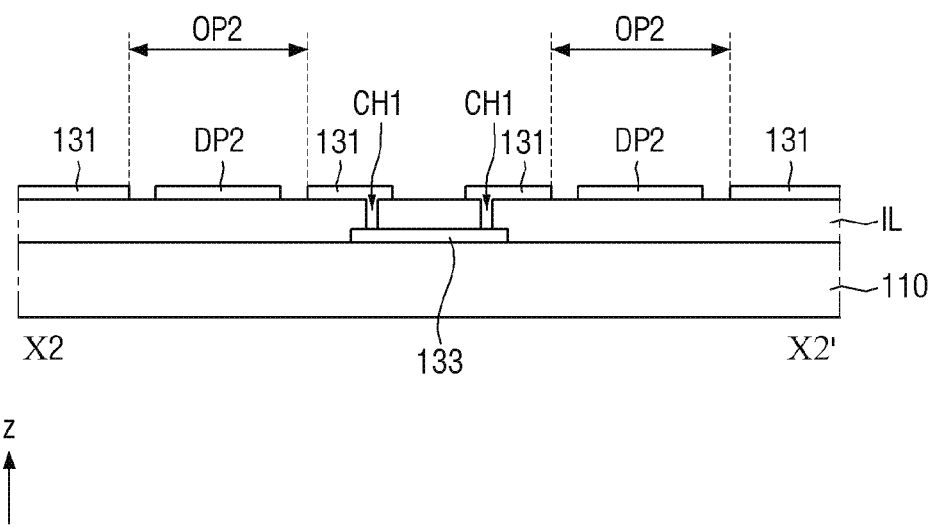
FIG. 10 is a cross-sectional view taken along line X2-X2' of FIG. 4 according to an exemplary embodiment of the inventive concept.

FIG. 8 is a diagram illustrating a structure of a second layer and a position of a contact hole of the sensor unit shown in FIG. 4 according to an exemplary embodiment of the inventive concept. FIG. 9 is a cross-sectional view taken along line X1-X1' of FIG. 4 according to an exemplary embodiment of the inventive concept. FIG. 10 is a cross-sectional view taken along line X2-X2' of FIG. 4 according to an exemplary embodiment of the inventive concept.

Figure 11:
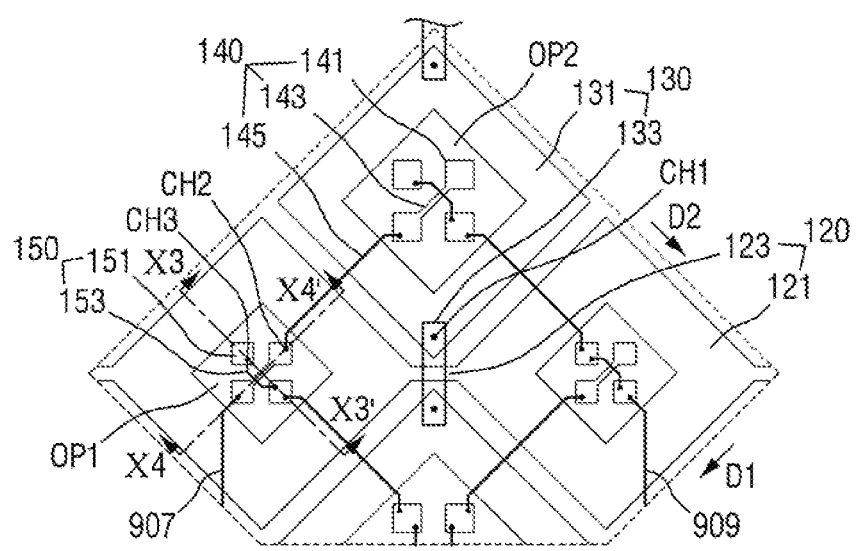
FIG. 11 is an enlarged plan view of a fingerprint sensing area of FIG. 3 according to an exemplary embodiment of the inventive concept.
Figure 11:
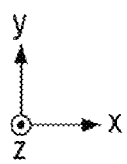
Figure 12:
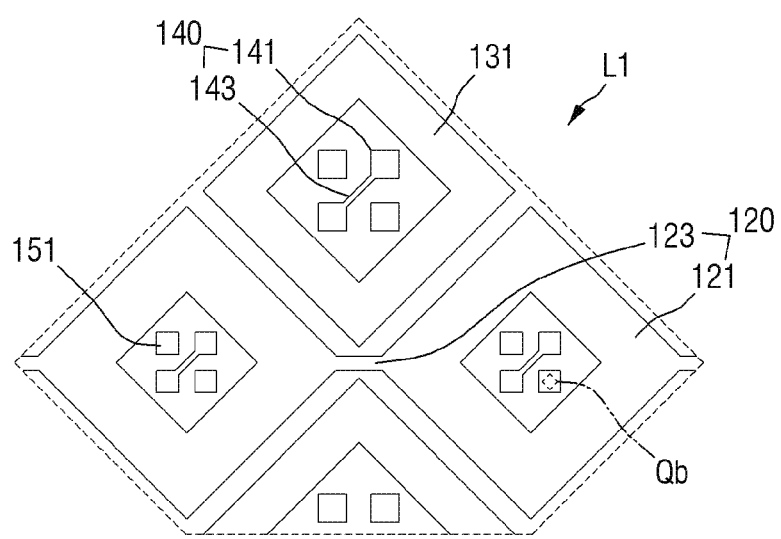
FIG. 12 is a diagram illustrating a structure of a first layer of the sensor unit shown in FIG. 11 according to an exemplary embodiment of the inventive concept.
Figure 13:
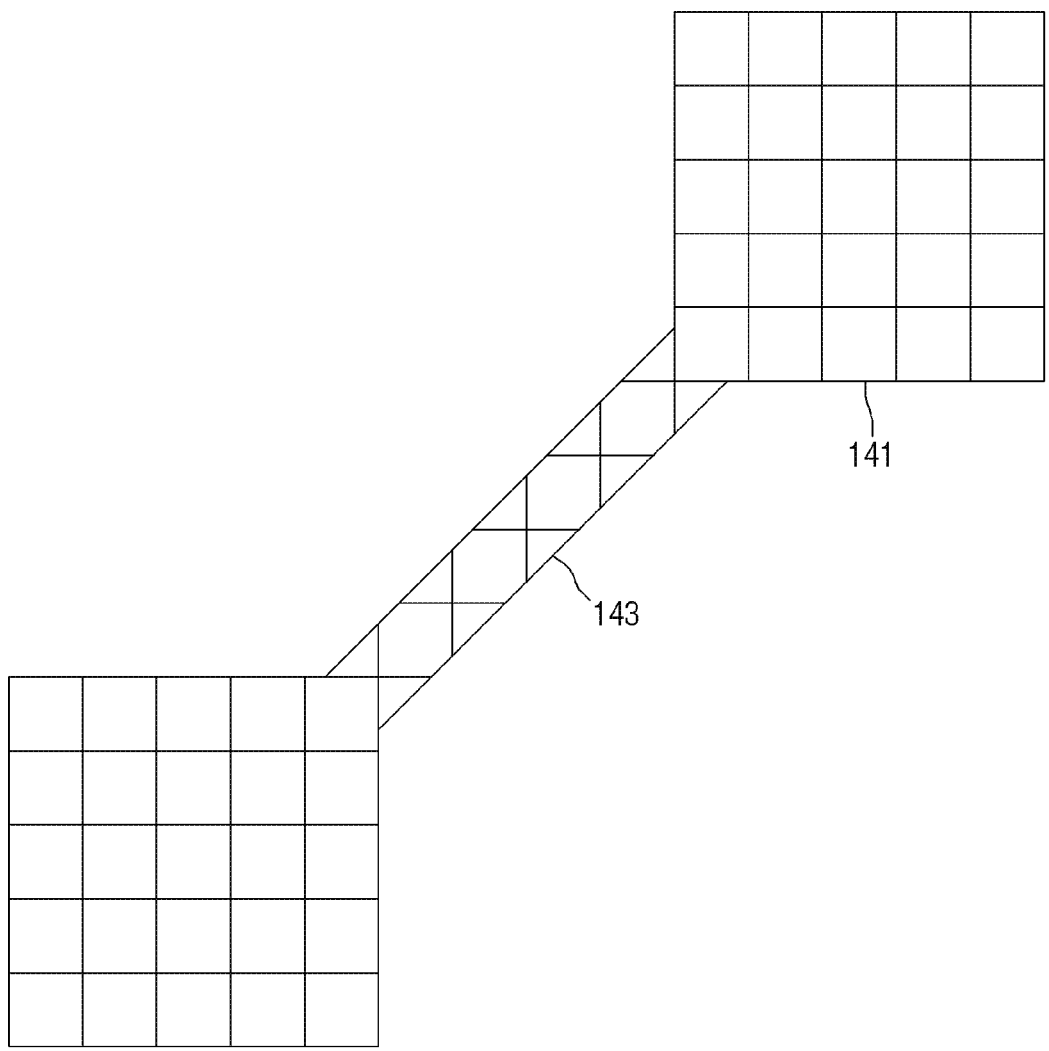
FIG. 13 is an enlarged plan view of a first fingerprint electrode and a first connection pattern of FIG. 11 according to an exemplary embodiment of the inventive concept.
Figure 14:
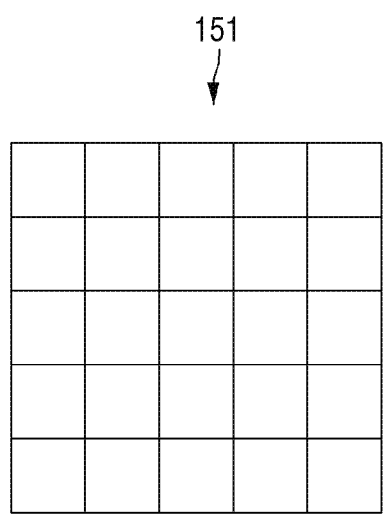
FIG. 14 is an enlarged plan view of a second fingerprint electrode of FIG. 11 according to an exemplary embodiment of the inventive concept.
Figure 14:
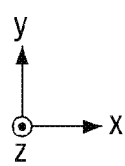
Figure 15:
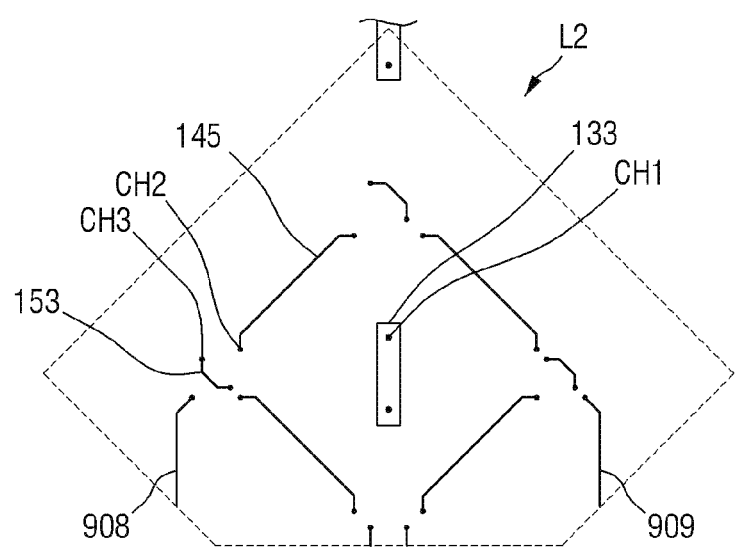
FIG. 15 is a diagram illustrating a structure of a second layer and a position of a contact hole of the sensor unit shown in FIG. 11 according to an exemplary embodiment of the inventive concept.
Figure 16:
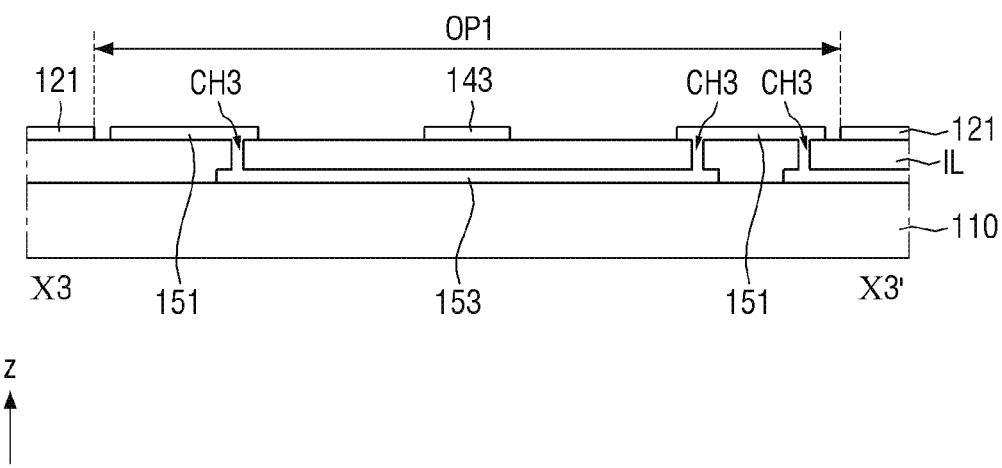
FIG. 16 is a cross-sectional view taken along line X3-X3' of FIG. 11 according to an exemplary embodiment of the inventive concept.
Figure 17:
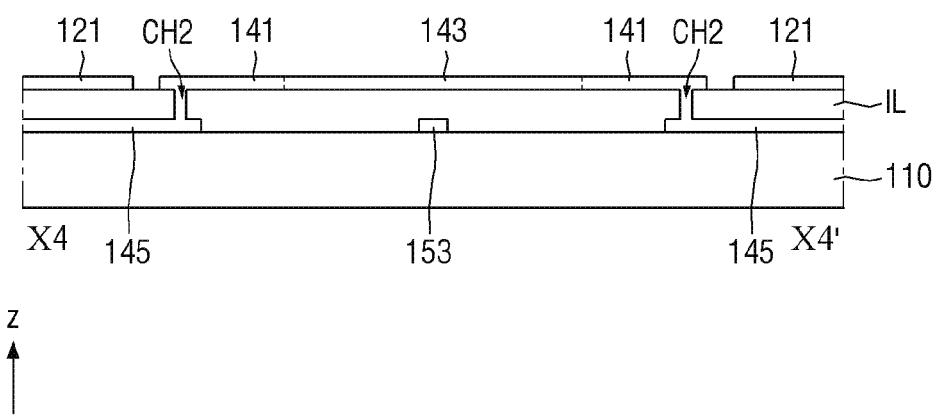
FIG. 17 is a cross-sectional view taken along line X4-X4' of FIG. 11 according to an exemplary embodiment of the inventive concept.

FIG. 11 is an enlarged plan view of a fingerprint sensing area of FIG. 3 according to an exemplary embodiment of the inventive concept. FIG. 12 is a diagram illustrating a structure of a first layer of the sensor unit shown in FIG. 11 according to an exemplary embodiment of the inventive concept. FIG. 13 is an enlarged plan view of a first fingerprint electrode and a first connection pattern of FIG. 11 according to an exemplary embodiment of the inventive concept. FIG. 14 is an enlarged plan view of a second fingerprint electrode of FIG. 11 according to an exemplary embodiment of the inventive concept. FIG. 15 is a diagram illustrating a structure of a second layer and a position of a contact hole of the sensor unit shown in FIG. 11 according to an exemplary embodiment of the inventive concept. FIG. 16 is a cross-sectional view taken along line X3-X3' of FIG. 11 according to an exemplary embodiment of the inventive concept. FIG. 17 is a cross-sectional view taken along line X4-X4' of FIG. 11 according to an exemplary embodiment of the inventive concept.

Referring to FIGS. 3 to 17, as illustrated in FIGS. 3 and 4, the sensor unit 100 may include a base layer 110, the first touch electrode members 120, the second touch electrode members 130, the first fingerprint electrode members 140, and the second fingerprint electrode members 150.

The base layer 110 may include the sensing area SA and the peripheral area NSA. As described above, the sensing area SA may include the fingerprint sensing area FSA.

The base layer 110 is a layer serving as a base of the sensor unit 100. In exemplary embodiments of the inventive concept, the base layer 110 may be one of the layers constituting the display panel 300. For example, in an exemplary embodiment in which the sensor unit 100 and the display panel 300 are integrally formed, the base layer 110 may be at least one layer constituting the display panel 300. For example, the base layer 110 may be a thin film encapsulation layer of the display panel 300. Alternatively, in exemplary embodiments of the inventive concept, the base layer 110 may be a rigid substrate or a flexible substrate. For example, the base layer 110 may be a rigid substrate made of glass or tempered glass, or a flexible substrate formed of a thin film of a flexible plastic material. Hereinafter, a case where the base layer 110 includes at least one layer constituting the display panel 300, for example, a layer including a thin film encapsulation layer, will be described as an example.

The first touch electrode members 120, the second touch electrode members 130, the first fingerprint electrode members 140, and the second fingerprint electrode members 150 may be located on the sensing area SA of the base layer 110.

As described above, the first touch electrode members 120 may extend in the first direction x and may be spaced apart from one another in the second direction y. The first touch electrode members 120 spaced apart from one another along the second direction y may form electrode rows. Although FIG. 3 illustrates that four first touch electrode members 120 are arranged along the second direction y to form four electrode rows, the inventive concept is not limited thereto. The number of the first touch electrode members 120 may be variously changed.

The first touch electrode member 120 may include a plurality of first touch electrodes 121 arranged along the first direction x, and a first connector 123 electrically connecting the first touch electrodes 121 adjacent to one another along the first direction x. In the following exemplary embodiments, the term "connecting" may inclusively mean "connecting" physically and/or electrically.

In exemplary embodiments of the inventive concept, as shown in FIG. 5, the first touch electrodes 121 may be located in a first layer L1. The first touch electrodes 121 may have a rhombus shape or a square shape, but is not limited thereto. The first touch electrodes 121 may be modified in various shapes such as a triangle, a quadrilateral other than a rhombus, a quadrilateral other than a square, a pentagon, a circle, a bar, or the like.

The first touch electrodes 121 may include a conductive material. For example, the conductive material may include a metal or an alloy thereof. The metal may be at least one selected from the group consisting of gold (Au), silver (Ag), aluminum (Al), molybdenum (Mo), chromium (Cr), titanium (Ti), nickel (Ni), neodymium (Nd), copper (Cu), platinum (Pt) or the like. Additionally, the first touch electrodes 121 may be made of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, or the like.

In exemplary embodiments of the inventive concept, the first touch electrodes 121 may have a single-layer structure or a multilayer structure. When the first touch electrodes 121 have a multilayer structure, the first touch electrodes 121 may include multiple metal layers. For example, the first touch electrodes 121 may have a three-layer structure of Ti/Al/Ti.

In exemplary embodiments of the inventive concept, the first touch electrodes 121 may have a mesh structure to prevent them from being visually recognized by the user. When the first touch electrodes 121 have a mesh structure, the first touch electrodes 121 may be disposed so as not to overlap an emission region of the display panel. In other words, mesh holes overlapping the emission region may be defined in the first touch electrodes 121 having the mesh structure.

The first touch electrode 121 may include a first opening OP1. For example, at least a central portion of each of the first touch electrodes 121 may be opened to expose a layer below. For example, when an insulating layer IL is located below the first touch electrodes 121 as illustrated in FIG. 9, a portion of the insulating layer IL may be exposed through the first opening OP1.

The first connector 123 may electrically connect the first touch electrodes 121 adjacent to one another in the first direction x, and the first connector 123 may be in contact with the first touch electrodes 121. In exemplary embodiments of the inventive concept, as illustrated in FIG. 5, the first connector 123 may be located on the same first layer L1 as the first touch electrodes 121 and second touch electrodes 131.

The first connector 123 may be insulated from a second connector 133 and may cross the second connector 133. In exemplary embodiments of the inventive concept, as shown in FIGS. 9 and 10, the insulating layer IL may be located between the first connector 123 and the second connector 133.

The insulating layer IL may include an insulating material. In exemplary embodiments of the inventive concept, the insulating material may be an inorganic insulating material or an organic insulating material. The inorganic insulating material may include at least one of aluminum oxide, titanium oxide, silicon oxide, silicon oxynitride, zirconium oxide, or hafnium oxide. The organic insulating material may include at least one of acrylic resin, methacrylic resin, polyisoprene, vinyl resin, epoxy resin, urethane resin, cellulose resin, siloxane resin, polyimide resin, polyamide resin, or perylene resin.

The first connector 123 may include a conductive material. In exemplary embodiments of the inventive concept, the first connector 123 may include the same material as the first touch electrodes 121, or may include one or more materials selected from constituent materials of the first touch electrodes 121. In exemplary embodiments of the inventive concept, the first connector 123 may have a single layer structure or a multilayer structure. For example, the first connector 123 may have a three-layer structure of Ti/Al/Ti. However, the inventive concept is not limited thereto, and the first connector 123 may be formed of a material different from that of the first touch electrodes 121.

As described above, the second touch electrode members 130 may extend in the second direction y and may be spaced apart from one another in the first direction x. The second touch electrode members 130 spaced apart from one another along the first direction x may form columns Although FIG. 3 illustrates that three second touch electrode members 130 are arranged along the first direction x to form three columns, the inventive concept is not limited thereto. The number of the second touch electrode members 130 may be variously changed.

The second touch electrode members 130 may include the plurality of second touch electrodes 131 arranged along the second direction y, and the second connector 133 electrically connecting the second touch electrodes 131 adjacent to one another along the second direction y.

The plurality of second touch electrodes 131 may be electrically connected to one another along the second direction y. In addition, the second touch electrodes 131 may be spaced apart from one another in the first direction x.

The second touch electrode 131 may include a second opening OP2. For example, at least a central portion of each of the second touch electrodes 131 may be opened to expose a layer below. For example, when the insulating layer IL is located below the second touch electrode 131 as illustrated in FIG. 10, a portion of the insulating layer IL may be exposed through the second opening OP2.

In exemplary embodiments of the inventive concept, an area of the second opening OP2 may be different from an area of the first opening OP1. For example, the area of the second opening OP2 may be larger than the area of the first opening OP1. However, the inventive concept is not limited thereto, and the area of the second opening OP2 may be the same as the area of the first opening OP1.

Although FIGS. 3 and 4 illustrate that one second connector 133 is disposed between the second touch electrodes 131 adjacent to one another in the second direction y, the number of second connectors 133 may be variously changed. For example, two or more second connectors 133 may be disposed between two second touch electrodes 131 adjacent to each other in the second direction y.

In exemplary embodiments of the inventive concept, as shown in FIG. 5, the second touch electrodes 131 may be located on the same first layer L1 as the first touch electrodes 121. The planar shape of the second touch electrode 131 may be a rhombus shape, but is not limited thereto. For example, the second touch electrode 131 may be modified in various shapes such as a triangle, a rectangle other than a rhombus, a pentagon, a circle, a bar, or the like.

The second connector 133 may electrically connect the second touch electrodes 131 adjacent to each other in the second direction y, and the second connector 133 may be in contact with the second touch electrodes 131. In exemplary embodiments of the inventive concept, the second connector 133 may be formed in a bridge-shaped connection pattern. In exemplary embodiments of the inventive concept, as illustrated in FIG. 8, the second connectors 133 may be located on a second layer L2 different from the first layer L1 where the second touch electrodes 131 are located.

In exemplary embodiments of the inventive concept, as illustrated in FIG. 10, the insulating layer IL may be located between the second touch electrodes 131 and the second connectors 133. In exemplary embodiments of the inventive concept, the second connectors 133 located in the second layer L2 may be disposed on the base layer 110, the insulating layer IL may be disposed on the second connectors 133, and the second touch electrodes 131 located in the first layer L1 may be disposed on the insulating layer IL. Further, the second connector 133 and the second touch electrode 131 may be connected to each other and in direct contact with each other through a first contact hole CH1 formed in the insulating layer IL.

The second connector 133 may be insulated from the first connector 123 and may cross the first connector 123. In exemplary embodiments of the inventive concept, as shown in FIGS. 9 and 10, the insulating layer IL may be located between the second connector 133 and the first connector 123.

The second touch electrode 131 and the second connector 133 may include a conductive material. In exemplary embodiments of the inventive concept, the second touch electrodes 131 may be made of the same conductive material as the first touch electrodes 121 and the first connector 123.

In exemplary embodiments of the inventive concept, when the first touch electrodes 121 have a mesh structure, the second touch electrodes 131 and the first connectors 123 may have a mesh structure similar to the first touch electrodes 121.

In exemplary embodiments of the inventive concept, the second touch electrodes 131 may be driving electrodes which receive driving signals Ts for detecting a touch position, and the first touch electrodes 121 may be sensing electrodes which output sensing signals Rs for detecting a touch position.

In exemplary embodiments of the inventive concept, as shown in FIGS. 3 and 5, a first dummy pattern DP1 may be disposed in the first opening OP1, and a second dummy pattern DP2 may be disposed in the second opening OP2.

As shown in FIG. 3, the first dummy patterns DP1 and the second dummy patterns DP2 may be disposed in the first openings OP1 and the second openings OP2 located in a region of the sensing area SA excluding the fingerprint sensing area FSA.

In exemplary embodiments of the inventive concept, when the first touch electrodes 121 and the second touch electrodes 131 have a mesh structure, as shown in FIGS. 6 and 7, the first dummy patterns DP1 and the second dummy patterns DP2 may have a mesh structure. When the first dummy patterns DP1 and the second dummy patterns DP2 have a mesh structure, the first dummy patterns DP1 and the second dummy patterns DP2 may be disposed so as not to overlap the emission region of the display panel 300. In other words, mesh holes overlapping the emission region may be defined in the first dummy patterns DP1 and the second dummy patterns DP2 having the mesh structure.

The first dummy patterns DP1 and the second dummy patterns DP2 may be located on the same first layer L1 as the first touch electrodes 121, the second touch electrodes 131, and the first connectors 123, and may be formed of the same material as the first touch electrodes 121, the second touch electrodes 131, and the first connectors 123.

As the first openings OP1 and the second openings OP2 are formed in the first touch electrodes 121 and the second touch electrodes 131, a difference in external light reflectance may occur. Thus, pattern stains may be visually recognized from the outside. The first dummy patterns DP1 and the second dummy patterns DP2 may reduce the difference in external light reflectance, thus reducing the possibility of pattern stains being visually recognized from the outside.

The first dummy pattern DP1 may be located in the first opening OP1 and spaced apart from the first touch electrode 121. In exemplary embodiments of the inventive concept, the first dummy pattern DP1 may be in a floating state.

In exemplary embodiments of the inventive concept, the first dummy pattern DP1 may have substantially the same shape as the first opening OP1. For example, when the first opening OP1 has a rhombus shape, the first dummy pattern DP1 may also have a rhombus shape. However, the inventive concept is not limited thereto, and the first dummy pattern DP1 may have substantially the same shape as a first fingerprint electrode 141 and a second fingerprint electrode 151 to be described below.

In exemplary embodiments of the inventive concept, the second dummy pattern DP2 may have substantially the same shape as the second opening OP2. For example, when the second opening OP2 has a rhombus shape, the first dummy pattern DP1 may also have a rhombus shape. However, the inventive concept is not limited thereto, and the second dummy pattern DP2 may have the same shape as the first fingerprint electrode 141 and the second fingerprint electrode 151 to be described below.

In exemplary embodiments of the inventive concept, the area of the first opening OP1 may be smaller than the area of the second opening OP2. Accordingly, the area of the first dummy pattern DP1 may be larger than the area of the second dummy pattern DP2. However, the inventive concept is not limited thereto. When the area of the first opening OP1 is the same as the area of the second opening OP2, the area of the first dummy pattern DP1 may be the same as the area of the second dummy pattern DP2.

The first fingerprint electrode members 140 and the second fingerprint electrode members 150 may be located on the fingerprint sensing area FSA of the base layer 110.

The first fingerprint electrode members 140 may be disposed in the first openings OP1 and the second openings OP2 located on the fingerprint sensing area FSA.

The first fingerprint electrode member 140 may include a plurality of first fingerprint electrodes 141 arranged along a first diagonal direction D1, a first connection pattern 143 electrically connecting the first fingerprint electrodes 141 located in the same openings OP1 and OP2, and adjacent to each other along the first diagonal direction D1, and a first connection line 145 electrically connecting the first fingerprint electrodes 141 located in the neighboring openings OP1 and OP2. The first diagonal direction D1 may be diagonal with respect to the first direction x.

In exemplary embodiments of the inventive concept, as shown in FIG. 12, the first fingerprint electrodes 141 may be located in the first layer L1. The first fingerprint electrode 141 may have a quadrilateral shape, but is not limited thereto and may be modified in various shapes.

The first fingerprint electrodes 141 may include a conductive material. In exemplary embodiments of the inventive concept, the first fingerprint electrodes 141 may be formed of the same material as the first touch electrodes 121 and the second touch electrodes 131.

In exemplary embodiments of the inventive concept, the first fingerprint electrodes 141 may have a single-layer structure or a multilayer structure. When the first fingerprint electrodes 141 have a multilayer structure, the first fingerprint electrodes 141 may include a plurality of metal layers. For example, the first fingerprint electrodes 141 may have a three-layer structure of Ti/Al/Ti.

In exemplary embodiments of the inventive concept, as shown in FIG. 13, the first fingerprint electrodes 141 may have a mesh structure to prevent them from being visually recognized by the user. When the first fingerprint electrodes 141 have a mesh structure, the first fingerprint electrodes 141 may be disposed so as not to overlap the emission region of the display panel 300. In other words, mesh holes overlapping the emission region may be defined in the first fingerprint electrodes 141 having the mesh structure.

The first connection pattern 143 may electrically connect the first fingerprint electrodes 141 adjacent to each other along the first diagonal direction D1 in the same openings OP1 and OP2, and may be in contact with the first fingerprint electrodes 141. In exemplary embodiments of the inventive concept, as shown in FIG. 12, the first connection pattern 143 may be located in the same first layer L1 as the first touch electrodes 121, the second touch electrodes 131, the first connectors 123, the first fingerprint electrodes 141, and the second fingerprint electrodes 151.

The first connection pattern 143 may be insulated from a second connection line 153 and cross the second connection line 153. In exemplary embodiments of the inventive concept, as illustrated in FIGS. 16 and 17, the insulating layer IL may be positioned between the first connection pattern 143 and the second connection line 153.

In exemplary embodiments of the inventive concept, the first connection pattern 143 may include a conductive material. In exemplary embodiments of the inventive concept, the first connection pattern 143 may be made of the same material as the first fingerprint electrodes 141. However, the inventive concept is not limited thereto.

In exemplary embodiments of the inventive concept, as shown in FIG. 13, the first connection patterns 143 may have a mesh structure to prevent them from being visually recognized by the user.

The first connection line 145 may electrically connect the first fingerprint electrodes 141 located in the openings OP1 and OP2 adjacent to each other along the first diagonal direction D1, and the first connection line 145 may be in contact with the first fingerprint electrodes 141. In exemplary embodiments of the inventive concept, the first connection line 145 may be formed in a bridge-shaped connection pattern. In exemplary embodiments of the inventive concept, as shown in FIG. 15, the first connection lines 145 may be located on the second layer L2 different from the first layer L1 where the first fingerprint electrodes 141 are located.

In exemplary embodiments of the inventive concept, as shown in FIG. 17, the insulating layer IL may be located between the first fingerprint electrodes 141 and the first connection lines 145. In exemplary embodiments of the inventive concept, the first connection lines 145 located in the second layer L2 may be disposed on the base layer 110, the insulating layer IL may be disposed on the first connection lines 145, and the first fingerprint electrodes 141 located in the first layer L1 may be disposed on the insulating layer IL. Further, the first connection lines 145 and the first fingerprint electrodes 141 may be connected to and in direct contact with each other through a second contact hole CH2 formed in the insulating layer IL.

The first connection lines 145 may include a conductive material. In exemplary embodiments of the inventive concept, the first connection lines 145 may be formed of the same material as the first connection patterns 143 and the first fingerprint electrodes 141.

In exemplary embodiments of the inventive concept, the first connection lines 145 may be insulated from the first touch electrodes 121 and the second touch electrodes 131, and the first connection lines 145 may partially overlap the first touch electrodes 121 and the second touch electrodes 131. In exemplary embodiments of the inventive concept, as illustrated in FIGS. 16 and 17, the insulating layer IL may be located between the first connection lines 145 and the first and second touch electrodes 121 and 131.

The second fingerprint electrode members 150 may be disposed in the first openings OP1 and the second openings OP2 located on the fingerprint sensing area FSA.

The second fingerprint electrode members 150 may include a plurality of second fingerprint electrodes 151 arranged along a second diagonal direction D2 and the second connection line 153 electrically connecting the second fingerprint electrodes 151 adjacent to each other along the second diagonal direction D2. The second diagonal direction D2 may be diagonal with respect to the first direction x.

In exemplary embodiments of the inventive concept, as shown in FIG. 12, the second fingerprint electrodes 151 may be located in the first layer L1. The second fingerprint electrodes 151 may have a quadrilateral shape, but is not limited thereto and may be modified in various shapes.

The second fingerprint electrodes 151 may include a conductive material. In exemplary embodiments of the inventive concept, the second fingerprint electrodes 151 may be formed of the same material as the first touch electrodes 121, the second touch electrodes 131 and the first fingerprint electrodes 141.

In exemplary embodiments of the inventive concept, the second fingerprint electrodes 151 may have a single-layer structure or a multilayer structure. When the second fingerprint electrodes 151 have a multilayer structure, the second fingerprint electrodes 151 may include multiple metal layers. For example, the second fingerprint electrodes 151 may have a three-layer structure of Ti/Al/Ti.

In exemplary embodiments of the inventive concept, as shown in FIG. 14, the second fingerprint electrodes 151 may have a mesh structure to prevent them from being visually recognized by the user. When the second fingerprint electrodes 151 have a mesh structure, the second fingerprint electrodes 151 may be disposed so as not to overlap the emission region of the display panel 300. In other words, mesh holes overlapping the emission region may be defined in the second fingerprint electrodes 151 having the mesh structure.

The second connection line 153 may electrically connect the second fingerprint electrodes 151 adjacent to each other in the second diagonal direction D2 and may be in contact with the second fingerprint electrodes 151. In exemplary embodiments of the inventive concept, the second connection line 153 may be formed in a bridge-shaped connection pattern. In exemplary embodiments of the inventive concept, as shown in FIG. 15, the second connection line 153 may be located on the second layer L2 different from the first layer L1 where the second fingerprint electrodes 151 are located.

In exemplary embodiments of the inventive concept, as illustrated in FIG. 16, the insulating layer IL may be located between the second fingerprint electrodes 151 and the second connection lines 153. In exemplary embodiments of the inventive concept, the second connection lines 153 located in the second layer L2 may be disposed on the base layer 110, the insulating layer IL may be disposed on the second connection lines 153, and the second fingerprint electrodes 151 located in the first layer L1 may be disposed on the insulating layer IL. Further, the second connection line 153 and the second fingerprint electrode 151 may be connected to and in direct contact with each other through a third contact hole CH3 formed in the insulating layer IL.

In exemplary embodiments of the inventive concept, the second connection lines 153 may include a conductive material. In exemplary embodiments of the inventive concept, the second connection lines 153 may be made of the same material as the second fingerprint electrodes 151. However, the inventive concept is not limited thereto.

In exemplary embodiments of the inventive concept, the second connection lines 153 may be insulated from the first touch electrodes 121 and the second touch electrodes 131, and the second connection lines 153 may overlap the first touch electrodes 121 and the second touch electrodes 131. In exemplary embodiments of the inventive concept, as illustrated in FIGS. 16 and 17, the insulating layer IL may be located between the second connection lines 153 and the first and second touch electrodes 121 and 131.

In exemplary embodiments of the inventive concept, the second connection lines 153 may have a mesh structure to prevent them from being visually recognized by a user.

The second connection lines 153 may include a conductive material. In exemplary embodiments of the inventive concept, the second connection lines 153 may be formed of the same material as the first connection patterns 143 and the first fingerprint electrodes 141.

In exemplary embodiments of the inventive concept, the second fingerprint electrodes 151 may be driving electrodes which receive driving signals Ts for detecting a touch position, and the first fingerprint electrodes 141 may be sensing electrodes which output sensing signals Rs for detecting a touch position.

In exemplary embodiments of the inventive concept, the plurality of first fingerprint electrodes 141 and the plurality of second fingerprint electrodes 151 may be disposed in each of the openings OP1 and OP2. For example, as illustrated in FIG. 11, two first fingerprint electrodes 141 and two second fingerprint electrodes 151 may be disposed in each of the openings OP1 and OP2. However, the inventive concept is not limited thereto, and three or more first fingerprint electrodes 141 and three or more second fingerprint electrodes 151 may be disposed in each of the openings OP1 and OP2.

The first fingerprint electrodes 141 and the second fingerprint electrodes 151 may be spaced apart from each other. Each of the first fingerprint electrodes 141 and the second fingerprint electrodes 151 may be spaced apart from the first touch electrodes 121 and the second touch electrodes 131.

The first fingerprint electrodes 141 and the second fingerprint electrodes 151 may be formed by the same process as the first dummy patterns DP1 and the second dummy patterns DP2. In this case, the first dummy patterns DP1 and the second dummy patterns DP2 may have substantially the same shape as the first fingerprint electrodes 141 and the second fingerprint electrodes 151.

As described above, the fingerprint pattern of the user can be sensed through the first fingerprint electrodes 141 and the second fingerprint electrodes 151 disposed in the same layer as the first touch electrodes 121, the second touch electrodes 131, the first dummy patterns DP1, and the second dummy patterns DP2. Accordingly, since it is not necessary to form a separate fingerprint sensing layer, which is conventionally used for fingerprint detection, it is possible to simplify the manufacturing process and also reduce the cost. Furthermore, the display device may be implemented as a thin display device.

In exemplary embodiments of the inventive concept, as shown in FIG. 3, wirings 901, 905, 907, and 909 may be disposed on the peripheral area NSA of the base layer 110.

For example, the wirings 901, 905, 907 and 909 may include a second wiring 905 connected to one end of each of the first touch electrode members 120, a first wiring 901 connected to one end of each of the second touch electrode members 130, a third wiring 907 connected to the first fingerprint electrode members 140, and a fourth wiring 909 connected to the second fingerprint electrode members 150. However, the inventive concept is not limited thereto, and in exemplary embodiments of the inventive concept, the wiring connected to the second touch electrode members 130 may have a double routing structure.

The first wiring 901 may be provided plurally, and each of the first wirings 901 may be connected to one of the second touch electrode members 130. Further, the second wiring 905 may be provided plurally, and each of the second wirings 905 may be connected to one of the first touch electrode members 120. The third wiring 907 may be provided plurally, and each of the third wirings 907 may be connected to one of the first fingerprint electrode members 140. The fourth wiring 909 may be provided plurally, and each of the fourth wirings 909 may be connected to one of the second fingerprint electrode members 150.

Pad portions TP1, TP2, and FP may be located on the peripheral area NSA of the base layer 110. The pad portions TP1, TP2, and FP may include touch pad portions TP1 and TP2 and a fingerprint pad portion FP. The touch pad portions TP1 and TP2 and the fingerprint pad portion FP may be electrically connected to the wirings 901, 905, 907, and 909, respectively. Further, the sensor controller 200 may be electrically connected to the touch pad portions TP1 and TP2 and the fingerprint pad portion FP.

In exemplary embodiments of the inventive concept, the touch pad portions TP1 and TP2 may include a first touch pad portion TP1 and a second touch pad portion TP2 spaced apart from each other along the first direction x. For example, the first touch pad portion TP1 may be connected to the first wiring 901, and the second touch pad portion TP2 may be connected to the second wiring 905. However, the inventive concept is not limited thereto. For example, the first touch pad portion TP1 and the second touch pad portion TP2 may form one pad portion without being spaced apart from each other. In addition, the wirings connected to each of the first touch pad portion TP1 and the second touch pad portion TP2 may be changed in various ways.

In exemplary embodiments of the inventive concept, the fingerprint pad portion FP may be disposed between the first touch pad portion TP1 and the second touch pad portion TP2. The fingerprint pad portion FP may be connected to the third wiring 907 and the fourth wiring 909. In exemplary embodiments of the inventive concept, the fingerprint pad portion FP may be divided into a first fingerprint pad portion connected to the third wiring 907 and a second fingerprint pad portion connected to the fourth wiring 909.

Figure 18:
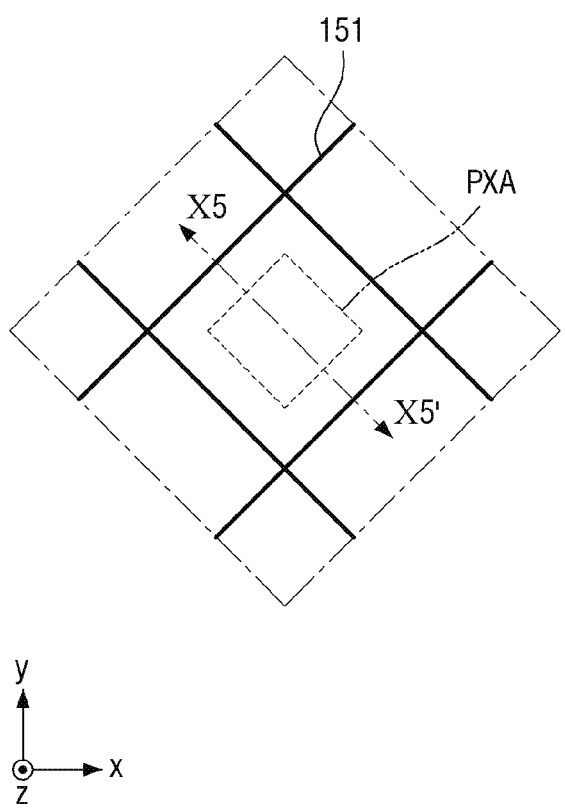
FIG. 18 is an enlarged plan view of a portion Qb of FIG. 12 according to an exemplary embodiment of the inventive concept.
Figure 19:
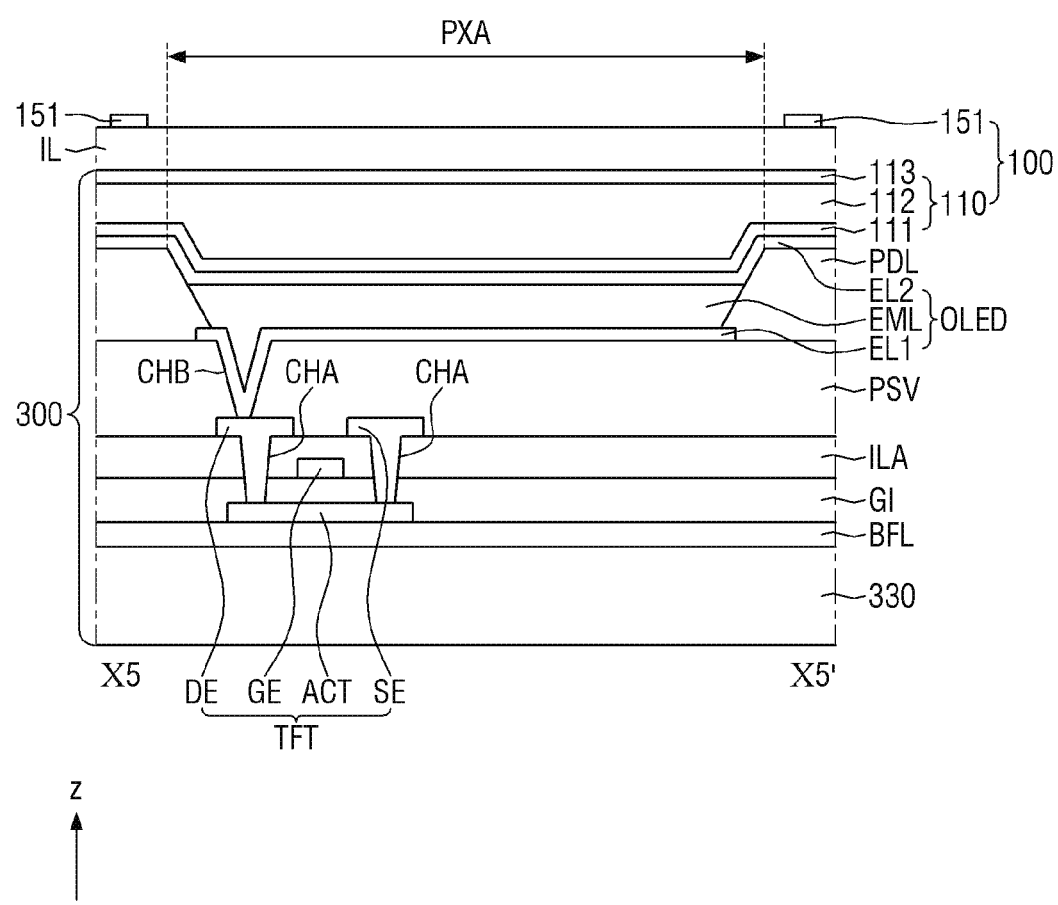
FIG. 19 is a cross-sectional view of the sensor unit and a display panel taken along line X5-X5' of FIG. 18 according to an exemplary embodiment of the inventive concept.

FIG. 18 is an enlarged plan view of a portion Qb of FIG. 12 according to an exemplary embodiment of the inventive concept. FIG. 19 is a cross-sectional view of the sensor unit and a display panel taken along line X5-X5' of FIG. 18 according to an exemplary embodiment of the inventive concept.

Referring to FIGS. 18 and 19, the sensor unit 100 may include, as the base layer 110, a thin film encapsulation layer of the display panel 300 (e.g., an organic light emitting display panel). In other words, the display panel 300 and the sensor unit 100 may be integrally formed. Hereinafter, the same reference numeral is used for the base layer 110 and a thin film encapsulation layer 110. For simplicity, FIG. 19 illustrates only a light emitting element (e.g., an organic light emitting diode (OLED)) and one thin film transistor (TFT) connected thereto among the components provided to each pixel of the display panel 300.

The display panel 300 includes a base substrate 330, a light emitting element OLED provided on one surface of the base substrate 330, and a thin film encapsulation layer 110 provided on the light emitting element OLED to cover at least the light emitting element OLED. In exemplary embodiments of the inventive concept, the display panel 300 may further include at least one thin film transistor TFT connected to the light emitting element OLED. The thin film transistor TFT may be located between the base substrate 330 and the light emitting element OLED.

In addition, the display panel 300 may further include at least one power line, signal line, capacitor, or the like.

In exemplary embodiments of the inventive concept, the base substrate 330 may be a rigid substrate or a flexible substrate, and its material is not particularly limited. For example, the base substrate 330 may be a thin film substrate having flexibility.

A buffer layer BFL is provided on one surface of the base substrate 330. The buffer layer BFL may prevent impurities from being diffused from the base substrate 330 and may improve flatness of the base substrate 330. The buffer layer BFL may be provided as a single layer, but is not limited thereto. For example, the buffer layer BFL may be provided as a multilayer of at least two or more layers. The buffer layer BFL may be an inorganic insulating layer made of an inorganic material. For example, the buffer layer BFL may be formed of silicon nitride, silicon oxide, silicon oxynitride, or the like.

The thin film transistor TFT is provided on the buffer layer BFL. The thin film transistor TFT includes an active layer ACT, a gate electrode GE, a source electrode SE, and a drain electrode DE. In exemplary embodiments of the inventive concept, the active layer ACT is provided on the buffer layer BFL and may be formed of a semiconductor material. For example, the active layer ACT may be a semiconductor pattern made of polysilicon, amorphous silicon, oxide semiconductor, or the like. One region (e.g., a region overlapping with the gate electrode GE) of the active layer ACT may not be doped with impurities, and the other region thereof may be doped with impurities.

A gate insulating layer GI may be provided on the active layer ACT, and the gate electrode GE may be provided on the gate insulating layer GI. Further, an interlayer insulating layer ILA may be provided on the gate electrode GE, and the source electrode SE and the drain electrode DE may be provided on the interlayer insulating layer ILA. The source electrode SE and the drain electrode DE may be in contact with the active layer ACT and electrically connected to the active layer ACT via respective contact holes CHA passing through the gate insulating layer GI and the interlayer insulating layer ILA.

In exemplary embodiments of the inventive concept, a passivation layer PSV is provided on the source electrode SE and the drain electrode DE. The passivation layer PSV may cover the thin film transistor TFT.

The light emitting element OLED is provided on the passivation layer PSV. The light emitting element OLED may include a first electrode EL1, a second electrode EL2, and an emission layer EML interposed between the first electrode EL1 and the second electrode EL2. In exemplary embodiments of the inventive concept, the first electrode EL1 of the light emitting element OLED may be an anode electrode. The first electrode EL1 of the light emitting element OLED may be in contact with one electrode, e.g., the drain electrode DE, of the thin film transistor TFT, and electrically connected to the drain electrode DE via a contact hole CHB passing through the passivation layer PSV.

On one surface of the base substrate 330 on which the first electrode EL1 and the like of the light emitting element OLED are formed, a pixel defining layer PDL is provided to partition an emission region PXA of each pixel. The pixel defining layer PDL may expose an upper surface of the first electrode EL1 and may protrude from the base substrate 330 along the circumference of each pixel region.

The emission layer EML is provided in the emission region PXA surrounded by the pixel defining layer PDL. For example, the emission layer EML may be disposed on the exposed surface of the first electrode EL1. In exemplary embodiments of the inventive concept, the emission layer EML may have a multilayer thin film structure including at least a light generation layer. For example, the emission layer EML may include a hole injection layer, a hole transport layer, a light generation layer, a hole blocking layer, an electron transport layer, and an electron injection layer. In exemplary embodiments of the inventive concept, the color of light generated from the emission layer EML may be one of red, green, and blue, but the inventive concept is not limited thereto. For example, the color of light generated from the emission layer EML may be one of magenta, cyan, and yellow.

The second electrode EL2 of the light emitting element OLED may be disposed on the emission layer EML. The second electrode EL2 of the light emitting element OLED may be a cathode electrode.

The thin film encapsulation layer 110 may be provided on the second electrode EL2 of the light emitting element OLED to cover the second electrode EL2 of the light emitting element OLED. The thin film encapsulation layer 110 seals the light emitting element OLED. The thin film encapsulation layer 110 includes at least one inorganic layer (hereinafter, referred to as an encapsulation inorganic layer). The thin film encapsulation layer 110 may further include at least one organic layer (hereinafter, referred to as an encapsulation organic layer). The encapsulation inorganic layer protects the light emitting element OLED from moisture/oxygen, and the encapsulation organic layer protects the light emitting element OLED from foreign matter such as dust particles. When the light emitting element OLED is encapsulated using the thin film encapsulation layer 110, it is possible to reduce the thickness of the display device and ensure flexibility.

The thin film encapsulation layer 110 may have a multilayer or a single layer structure. For example, the thin film encapsulation layer 110 may include a first encapsulation inorganic layer 111, an encapsulation organic layer 112, and a second encapsulation inorganic layer 113 sequentially stacked on the second electrode EL2.

In exemplary embodiments of the inventive concept, each of the first encapsulation inorganic layer 111 and the second encapsulation inorganic layer 113 may be formed of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), lithium fluoride, and/or the like.

In exemplary embodiments of the inventive concept, the encapsulation organic layer 112 may be formed of acrylic resin, methacrylic resin, polyisoprene, vinyl resin, epoxy resin, urethane resin, cellulose resin, perylene resin, and/or the like.

However, the structure of the thin film encapsulation layer 110 is not limited to the above-described example. In addition, the stacked structure of the thin film encapsulation layer 110 may be variously changed.

The components of the second layer (e.g., L2) of the sensor unit 100 as described above may be disposed on the thin film encapsulation layer 110, the insulating layer IL may be located on the second layer, and the first layer (e.g., L1) of the sensor unit 100 may be located on the insulating layer IL. In the drawing, the second fingerprint electrodes 151 are illustrated as the components of the first layer. As described above, the second fingerprint electrodes 151 may have a mesh structure to prevent them from being visually recognized by the user, and the second fingerprint electrodes 151 may be disposed so as not to overlap the emission region PXA. In other words, mesh holes overlapping the emission region PXA may be defined in the second fingerprint electrodes 151 having the mesh structure.

In the display device 1 according to the above-described exemplary embodiment, the display panel 300 may be implemented as an organic light emitting display panel having the thin film encapsulation layer 110, and the components of the sensor unit 100 may be disposed on the thin film encapsulation layer 110.

While the inventive concept has been shown and described with reference to exemplary embodiments thereof, it will be apparent to those of ordinary skill in the art that various changes in form and details may be made thereto without departing from the spirit and scope of the inventive concept as set forth by the appended claims.

What is claimed is:

1. A sensor module comprising:
a base layer including a fingerprint sensing area;
first touch electrode members arranged on the base layer along a first direction, and including a plurality of first touch electrodes electrically connected to one another along the first direction, wherein each of the plurality of first touch electrodes includes a first opening;

second touch electrode members arranged on the base layer along a second direction crossing the first direction, and including a plurality of second touch electrodes electrically connected to one another along the second direction;

a first fingerprint electrode member disposed on the fingerprint sensing area, and including a plurality of first fingerprint electrodes electrically connected to one another; and a second fingerprint electrode member disposed on the fingerprint sensing area, and including a plurality of second fingerprint electrodes electrically connected to one another, wherein two of the plurality of first fingerprint electrodes and two of the plurality of second fingerprint electrodes are disposed in the first opening of a corresponding one of the first touch electrodes the fingerprint sensing area, wherein a first connection pattern located entirely within the first opening and on a same layer as the two first fingerprint electrodes directly connects the two first fingerprint electrodes, and a second connection line located entirely within the first opening crosses the first connection pattern and directly connects the two second fingerprint electrodes, and wherein the two first fingerprint electrodes are spaced apart from the two second fingerprint electrodes in a plan view.

2. The sensor module of claim 1, wherein each of the plurality of second touch electrodes includes a second opening, and at least two first fingerprint electrodes of the plurality of first fingerprint electrodes and at least two second fingerprint electrodes of the plurality of second fingerprint electrodes are disposed in the second opening of corresponding second touch electrodes of the plurality of second touch electrodes in the fingerprint sensing area.

3. The sensor module of claim 2, wherein a first connection line electrically connects a first fingerprint electrode disposed in the first opening to a first fingerprint electrode disposed in the second opening.

4. The sensor module of claim 1, wherein the first connection pattern and the second connection line are located on different layers.

5. The sensor module of claim 1, wherein the plurality of first touch electrodes, the plurality of second touch electrodes, the plurality of first fingerprint electrodes, and the plurality of second fingerprint electrodes are disposed on the same layer.

6. The sensor module of claim 5, wherein the first connection pattern is disposed on the same layer as the plurality of first fingerprint electrodes.

7. The sensor module of claim 1, wherein the first connection pattern is located on a layer different from a layer where the plurality of first touch electrodes and the plurality of second touch electrodes are located, and the first connection pattern partially overlaps the plurality of first touch electrodes and the plurality of second touch electrodes.

8. The sensor module of claim 1, wherein the second connection line is located on a layer different from a layer where the plurality of first touch electrodes and the plurality of second touch electrodes are located, and the second connection line partially overlaps the plurality of first touch electrodes and the plurality of second touch electrodes.

9. The sensor module of claim 1, wherein the plurality of first fingerprint electrodes and the plurality of second fingerprint electrodes are spaced apart from the plurality of first touch electrodes and the plurality of second touch electrodes.

10. The sensor module of claim 1, wherein the first connection pattern and the first connection line extend in a first diagonal direction, and the second connection line extends in a second diagonal direction crossing the first diagonal direction, and wherein the first and second diagonal directions are diagonal with respect to the first direction.

11. The sensor module of claim 1, wherein the base layer includes a first encapsulation inorganic layer, an encapsulation organic layer disposed on the first encapsulation inorganic layer, and a second encapsulation inorganic layer disposed on the encapsulation organic layer, and the first connection line and the second connection line are disposed on the second encapsulation inorganic layer.

12. The sensor module of claim 1, further comprising:

a touch driver electrically connected to the second touch electrode members and configured to apply a first driving signal to the second touch electrode members; and a touch detector electrically connected to the first touch electrode members and configured to receive a first sensing signal from the first touch electrode members to recognize a touch input.

13. The sensor module of claim 12, further comprising:

a fingerprint driver electrically connected to the second fingerprint electrode member and configured to apply a second driving signal to the second fingerprint electrode member; and a fingerprint detector electrically connected to the first fingerprint electrode member and configured to receive a second sensing signal from the first fingerprint electrode member to recognize a fingerprint pattern.

14. The sensor module of claim 13, wherein the first sensing signal includes mutual capacitance information between the first touch electrode members and the second touch electrode members, and the second sensing signal includes mutual capacitance information between the first fingerprint electrode member and the second fingerprint electrode member.

15. A display device comprising:

a base substrate;

a light emitting element on the base substrate;

a thin film encapsulation layer on the light emitting element;

a touch electrode including an opening, wherein the touch electrode is disposed on the thin film encapsulation layer;

a fingerprint electrode member disposed in the opening and spaced apart from the touch electrode, wherein the fingerprint electrode member includes first fingerprint electrodes and second fingerprint electrodes; and a sensor controller electrically connected to each of the touch electrode and the fingerprint electrode member, and configured to detect a touch input from the touch electrode and to detect fingerprint pattern information based on a mutual capacitance measured between the first fingerprint electrode and the second fingerprint electrode, wherein two of the first fingerprint electrodes are directly connected to each other by a first connection pattern within the opening of the touch electrode and on the same layer as the two first fingerprint electrodes, two of the second fingerprint electrodes are directly connected to teach other by a second connection line crossing the first connection pattern and within the first opening, and wherein the two first fingerprint electrodes are spaced apart from the two second fingerprint electrodes in a plan view.

16. The display device of claim 15, wherein the plurality of first fingerprint electrodes and the plurality of second fingerprint electrodes are disposed on the same layer as the touch electrode.

* * * * *